(No Model.) 2 Sheets—Sheet 1.
R. G. PING & H. W. HANNA.
HOG AND HAY RACK.
No. 366,979. Patented July 19, 1887.
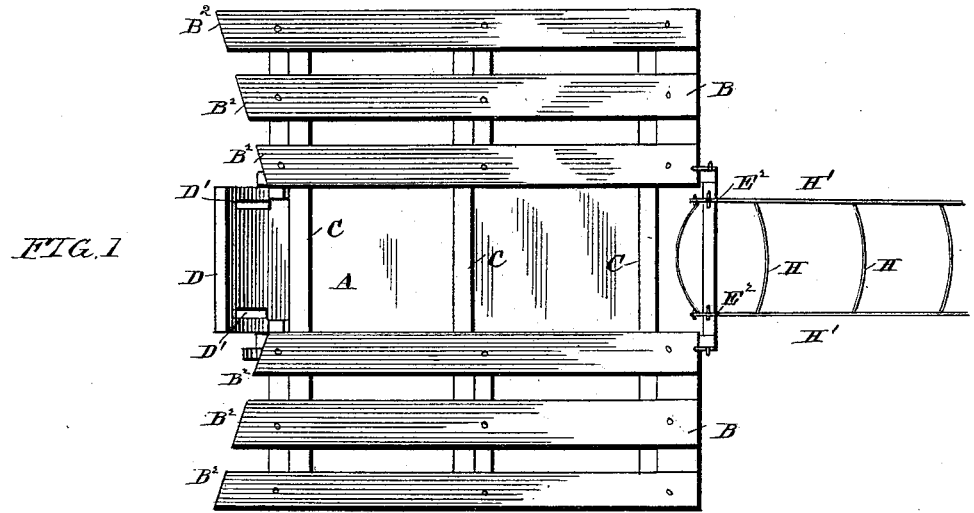
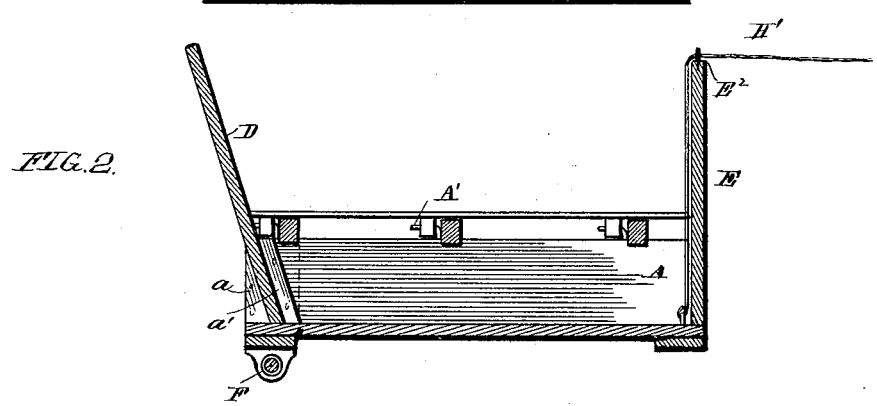
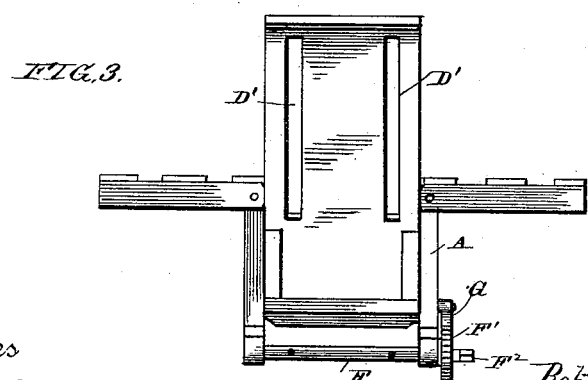
Witnesses
Jos. A. Ryan
W. F. Huntemann
Inventor
Robt. G. Ping.
Henry W. Hanna
By their Attorney in fact.
Chas. E. Barber (No Model.) 2 Sheets—Sheet 2.
R. G. PING & H. W. HANNA.
HOG AND HAY RACK.
No. 366,979. Patented July 19, 1887.
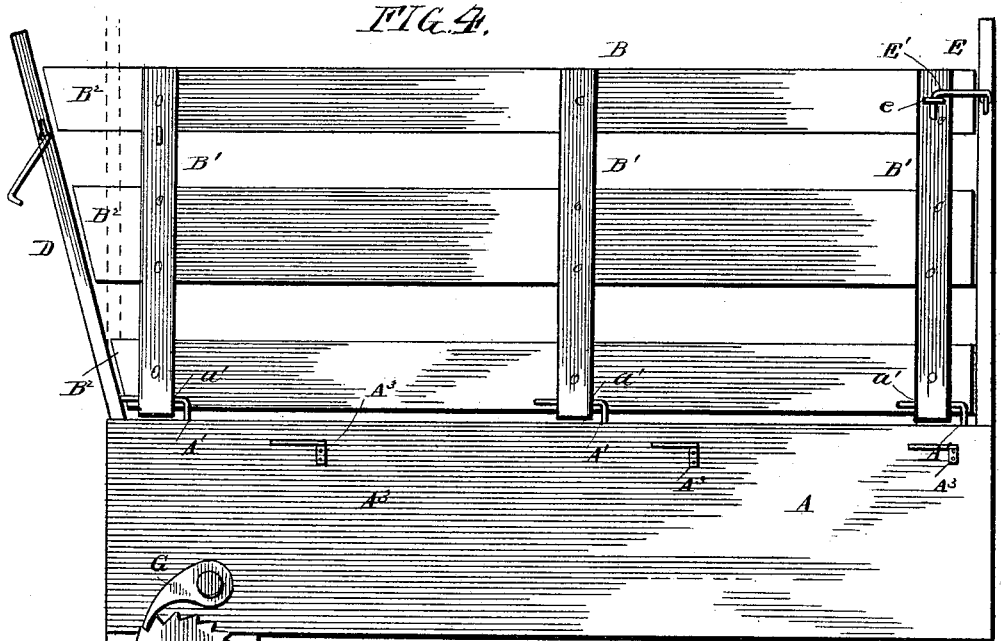
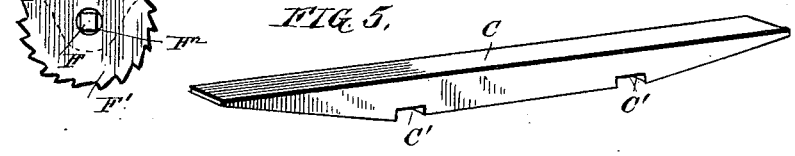
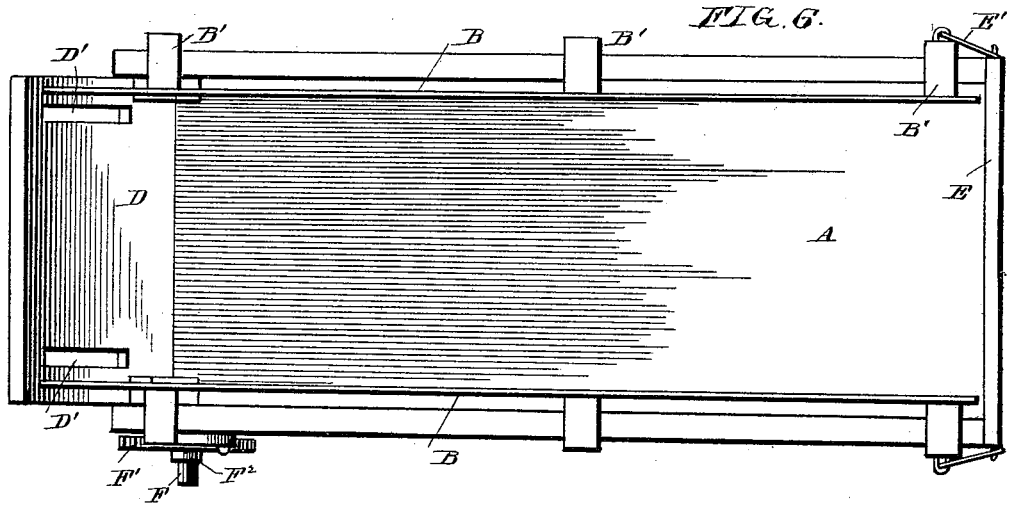
Witnesses
Jos. A. Ryan
Wm. F. Huntemann
Inventors:
Robt. G. Ping.
Henry W. Hanna
By their Attorney in fact,
Chas. A. Barbur

UNITED STATES PATENT OFFICE.

ROBERT G. PING AND HENRY W. HANNA, OF AUDUBON, IOWA.

HOG AND HAY RACK.

SPECIFICATION forming part of Letters Patent No. 366,979, dated July 19, 1887.

Application filed March 28, 1887. Serial No. 232,717. (No model.)

*To all whom it may concern:*

Be it known that we, ROBERT G. PING and HENRY W. HANNA, citizens of the United States, residing at Audubon, in the county of Audubon and State of Iowa, have invented certain new and useful Improvements in Sectional Folding Hog and Hay Racks, of which the following is so full, clear, and exact a decription as will enable others skilled in the art to which our invention appertains to make and use the same, reference being had to the accompanying drawings, in which—

Figure 1 is a top plan view of our invention, showing the movable side sections extended. Fig. 2 is a vertical section of the same. Fig. 3 is a rear end view of the same. Fig. 4 is a side elevation of the same, showing the movable side sections secured perpendicularly to form a hog-rack. Fig. 5 is a detail view of the cross-bars which fit on the upper edge of the wagon-box and support the movable side sections when they are extended horizontally. Fig. 6 is a top plan view of Fig. 4.

The object of our invention is to produce a cheap, durable, and efficient combined hog and hay rack, and one which may be converted from a hog-rack to a hay-rack, and vice versa, in the shortest possible time and with the least expense of physical force, and without the addition of special additional fixtures.

The invention consists in the novel construction and arrangement of parts, as will be hereinafter fully described, and particularly pointed out in the claims at the end of the specification.

In the accompanying drawings the box is designated by the reference-letter A, and to the upper edge of this box are pivoted the movable side sections, B B. These side sections may be secured in place vertically, as shown in Fig. 4, to convert the device into a hog-rack, or they may be extended, as shown in Fig. 1, to form a hay-rack. When extended as shown in Fig. 1, they are provided with horizontal bars or supports C C C, a detail of which is shown in Fig. 5. One end of the box A is provided with cleats $a$ $a'$, between which is secured the rear end-board, D. The rear end-board, D, is provided with vertical longitudinal slots D'. These slots may be replaced by perforations which are circular in shape when it is designed to use them only when the device is used as a hay-rack, and we do not wish to be understood as limiting ourselves to the shape of these perforations in the end-board D.

The front end-board, E, is secured rigidly in the box, and may or may not be provided with suitable rings for the reins. The outer edges of the front end-boards, E E, are provided with hooks E', which engage with staples $e'$ on the movable side sections, B B, when the device is converted into a hog-rack. To the upper edge of the box A are secured suitable hooks, A', which extend through perforations $a'$ in the lower portions of the movable side sections, B B. The movable side sections, B B, are braced with suitable cross-pieces, B' B' B'. At one end of the box A is secured a windlass, F, which is provided with a ratchet-wheel, F', and a pawl, G. The outer end of the windlass F is squared at $F^2$ to receive a key or crank-handle or wrench, which may be used to turn the windlass when it is desired to bind tightly a load of hay, straw, or other material with which the wagon may be loaded.

Instead of putting the hooks A' on the upper edges of the box A, they may be placed below the top of the upper edge of the side of the box A and made to engage with the rack in substantially the same way without departing from the spirit of our invention. We show a modification or a change of the form or location of these hooks in Fig. 4, in which we letter them $A^3$ for the purpose of designating them from the others. The cross-piece C, which supports the movable side sections in their extended horizontal position, is provided in its lower side with rectangular recesses C' C', which are adapted to extend over the top of the wagon-box, thus serving the double purpose of supporting the extended side sections, B, and holding the tops of the sides of the box A rigidly against lateral displacement.

The cleats $a'$ $a'$ may be extended vertically, instead of slanting, as shown in dotted lines in Fig. 2, and the rear end-board, D, may be straightened up to a perpendicular position, and the ends $B^2$ $B^2$ of the movable side sections, B B, may be extended through the rear end-board slots D' D', which will hold them rigidly in position when the device is used as a hog-rack.

The advantage of using the hooks A³ A³ below the upper edge of the wagon-box A will be readily understood and appreciated, as they will be less liable to accidental displacement in this position than they would be if on the top of the box. They will also be less liable to hook into a person's clothing or other things, as they would be likely to do if secured to the top of the box.

In Figs. 1 and 2 we show a rope, H' H', which may be either double or single and secured to one end of the wagon-box near the bottom. If made double, as shown in Fig. 1, it should be provided with suitable cross-stays, H H. The front end-board may be provided with the loops or perforations E² E², through which the rope or ropes H' may be extended when there is any tendency on the part of the load to be unstable because of its being top-heavy, and the effect of slipping of these ropes through the upper end of the front end-board will tend to give additional stability to the bulk of the load.

It will be observed that the hooks on the upper side of the main box A extend horizontally from the point where they are secured to the box, leaving one of their ends free and unobstructed. This will facilitate the ready removal of the movable side sections when it is desired to use the wagon simply as a truck for heavy work. At such a time the long end-board D may be removed and a suitable shorter one of the ordinary construction used in its stead.

It will be observed that the removable side sections, B B, are provided at their rear ends with pieces B² B² B², which slant diagonally from the box up and back. This adapts them to fit in and fill the space between the slanting end-board D and the vertical end-board E, and also furnishes a larger bearing for hay when the sides are extended. It also serves as a means of securing them more rigidly in place when extended through the slots in the vertical end-board D, and by the upper ones being longer the liability of their becoming accidentally displaced is thus greatly lessened. When it is desired, a hook may be secured to the rear end-board, D, similar to the one secured to the front end-board, E, and the movable side sections may be provided with a staple at the rear portion, with which the hook on the rear end-board may engage, in order to hold the rear end-board rigidly in place when the movable sections are secured in a vertical position by extending through the rear end-board.

When it is desired to use the device as a hay-rack or as a rack upon which to draw any bulky substance, the movable side sections are extended, as shown in Fig. 1, when the device is in the position to be loaded. After the load of hay or other similar bulky substance has been loaded on the device in this position, the load may be bound securely to the rack by extending the rope H' up around the front end, over the top of the load, and down through the perforations D' D' in the rear end-board, and securing the ends of the rope H' H' to the windlass and winding them tightly down, holding them securely in position by the ratchet and pawl shown in Fig. 4.

From the foregoing it will be observed that this device is readily convertible into either a hog or hay rack. The tightening of the device at the lower rear portion of the box may be readily and easily adjusted to take up any slack which may result from constant jolting of the load over rough roads, and the whole device is both durable and inexpensive, as well as being simple and efficient.

Having now described our invention, what we desire to secure by Letters Patent, and what we therefore claim, is—

1. A combined sectional convertible hog and hay rack of the character described, the same consisting of the main box, to which are pivotally secured the movable side sections, B B, and the rigid end-boards for supporting the movable sides in a perpendicular position, one of said end-boards being slotted, as described, whereby the ends of the movable sections may be extended through the slots to hold them in a vertical position, substantially as and for the purposes specified.

2. In a combined hog and hay rack of the character described, the combination of the main box provided with the movable side sections, B B, with the movable cross-pieces C, for holding the side sections when extended horizontally, substantially as described.

3. In a combined hog and hay rack of the character described, the combination of the main box provided with the movable side sections, the vertical end-boards, and the movable cross-pieces C, for supporting the movable side pieces when extended horizontally, with the binder H' H', the slotted rear end-board, D, and the ratchet-and-pawl mechanism for tightening up the binder, all constructed and combined to operate substantially as described.

In testimony that we claim the above as our invention we hereunto set our hands in the presence of two witnesses.

ROBERT G. PING.
HENRY W. HANNA.

Witnesses:
F. M. VAN PELT,
GEORGE KELLY.